United States Patent
Bielesch

(10) Patent No.: US 7,206,176 B2
(45) Date of Patent: Apr. 17, 2007

(54) CIRCUIT AND METHOD FOR PROTECTING AGAINST OVERLOAD OF AN ELECTRIC MOTOR

(75) Inventor: Thomas Bielesch, Mühlacker (DE)

(73) Assignee: BEHR GmbH & Co. KG, Stuttgart (DE)

( * ) Notice: Subject to any disclaimer, the term of this patent is extended or adjusted under 35 U.S.C. 154(b) by 303 days.

(21) Appl. No.: 10/519,714

(22) PCT Filed: Jul. 3, 2003

(86) PCT No.: PCT/EP03/07101

§ 371 (c)(1),
(2), (4) Date: Dec. 30, 2004

(87) PCT Pub. No.: WO2004/006406

PCT Pub. Date: Jan. 15, 2004

(65) Prior Publication Data

US 2005/0207074 A1 Sep. 22, 2005

(30) Foreign Application Priority Data

Jul. 4, 2002 (DE) ................................ 102 30 253

(51) Int. Cl.
*H02H 5/04* (2006.01)

(52) U.S. Cl. ............................ 361/26; 361/23; 361/24; 361/25

(58) Field of Classification Search ................... 361/26, 361/25, 24, 23
See application file for complete search history.

(56) References Cited

U.S. PATENT DOCUMENTS 3,638,718 A * 2/1972 Illg ............................ 165/287
4,988,930 A * 1/1991 Oberheide ................... 318/82
6,614,194 B2 * 9/2003 Kobayashi et al. ......... 318/111

* cited by examiner

Primary Examiner—Rita Leykin
(74) Attorney, Agent, or Firm—Foley & Lardner LLP

(57) ABSTRACT

The invention relates to a circuit (1) for protecting against overload of an electric motor (2), more particularly an electrically powered air blower for a vehicle, with the purpose of providing sufficient and appropriate protection even when several electric motors are connected in series. Said circuit is provided with at least one switching element (6) for controlling two series connected electric motors (2) independent of revolutions, in which a switch element (14) configured as a make contact element (12) is connected in parallel to the electric motor (2), said switch element causing short circuiting of the corresponding electric motor (2) in case of overheating.

10 Claims, 4 Drawing Sheets

Figure 3A:
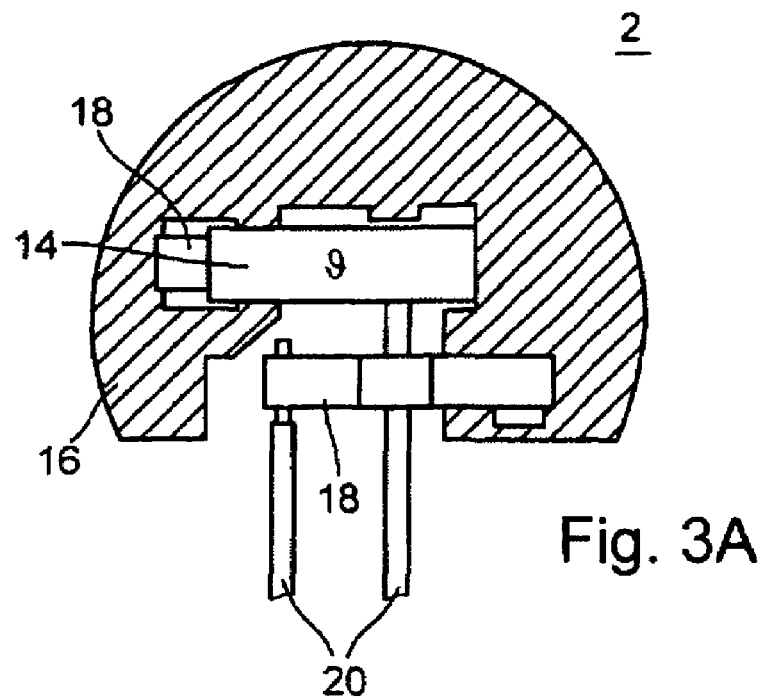

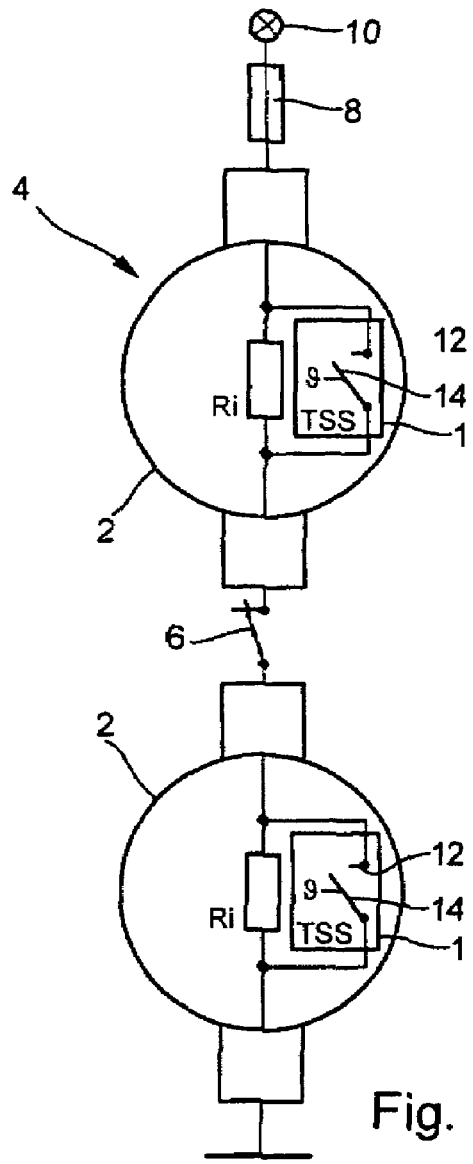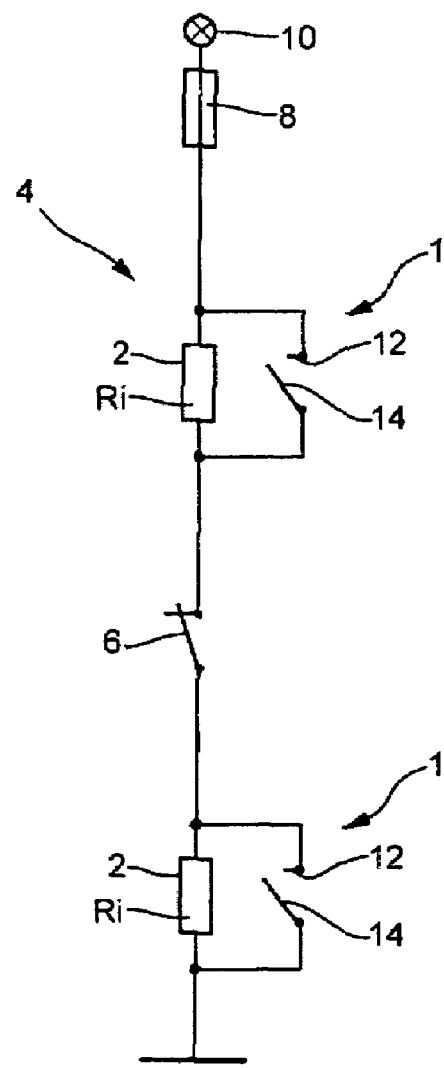
Fig. 1A
Fig. 1B

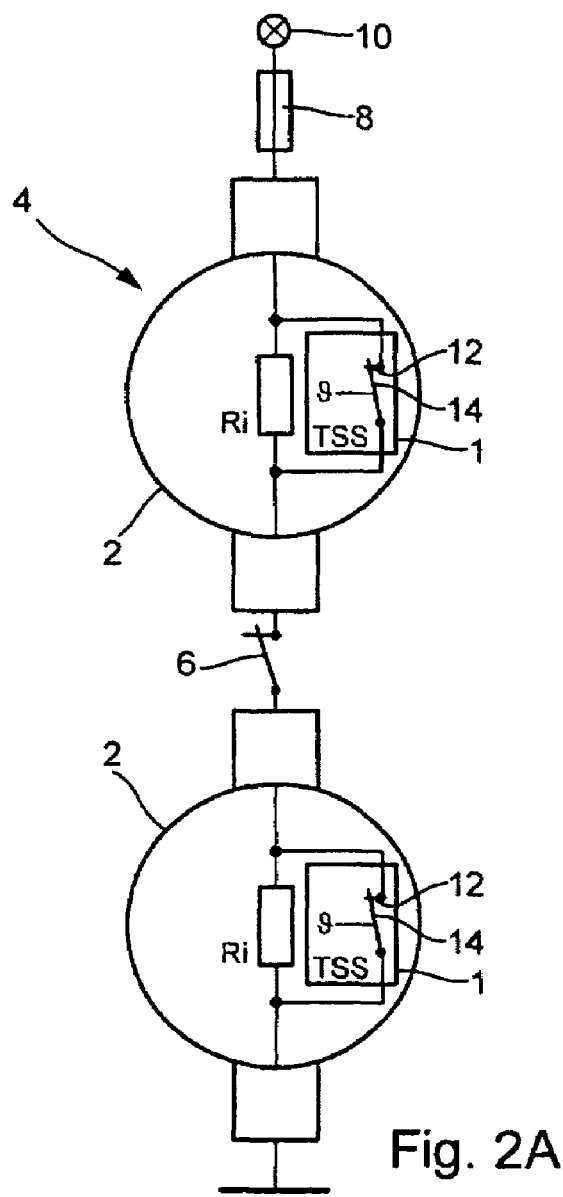
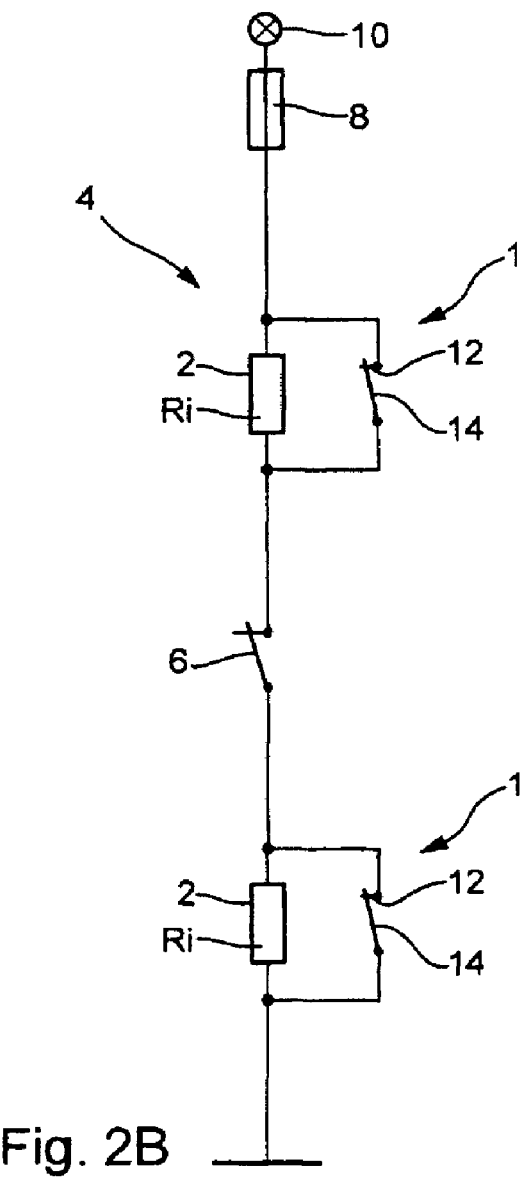
Fig. 2A
Fig. 2B

CIRCUIT AND METHOD FOR PROTECTING AGAINST OVERLOAD OF AN ELECTRIC MOTOR

The invention relates to an arrangement and a method for protecting against overload of an electric motor, in particular of an electrically driven fan blower for a vehicle.

In vehicles, in particular internal combustion engines, electrically operated fan blowers are used for cooling the internal combustion engines. This makes it possible to control and regulate, in a targeted manner, the heat balance in the internal combustion engine. In order to be able to operate the fan blower or the fan at different speed levels, for example two fan blowers are connected both in series for a minimum speed and in parallel for a maximum speed by means of a changeover element, for example a changeover relay.

When operating the fans in a parallel circuit, in the event of a fault in one of the fans, for example a fan being blocked, owing to an excess current resulting therefrom, a fuse element, for example a vehicle system fuse, is tripped and the circuit is interrupted. On the other hand, in the event of a fault in fans arranged in a series circuit, an increase in the internal resistance of the fan is brought about, as a result of which the tripping current of the fuse element is not reached.

In the field of air conditioning systems for protecting against excessive temperatures, reversible thermal circuit breakers are connected in the circuit of the relevant thermal components, as a result of which, in the event of a fault, i.e. in the event of an excessive temperature, the current flow in this circuit is interrupted. For this purpose, the thermal circuit breaker is in the form of a normally closed contact.

Since the thermal circuit breaker is designed in a known manner to be reversible, it is switched on again once the critical temperature has been undershot. Such circuit breakers can be used only to a limited extent in the motor cooling sector owing to their temperature range.

The invention therefore has the object of specifying an arrangement for protecting against overload of an electric motor, which also provides sufficient fuse protection in a series circuit comprising two or more electric motors. Furthermore, a method will be specified which is particularly suitable for protecting an electric motor against overload.

The object is achieved according to the invention by an arrangement for protecting against overload of an electric motor, at least one changeover element being provided for controlling, in a speed-dependent manner, two series-connected electric motors, in which a switch element in the form of a normally open contact is connected in parallel with the electric motor and, in the event of excessive temperatures, causes the relevant electric motor to be short-circuited.

In this case, the invention is based on the consideration that, in the event of excessive temperatures at one of the electric motors or at both electric motors, for example owing to a fan driven by the electric motor being blocked, for example by a foreign body having entered it, a considerable thermal load may result, in particular excessive heating, which leads to a rise in the internal resistance of the electric motor. This in turn leads to a fuse arranged in the circuit of the electric motor not responding owing to the current flow being limited by the increased internal resistance. The rise in the internal resistance of the electric motor thus needs to be reduced to such a level that the fuse arranged in the circuit for the electric motor is tripped. For this purpose, a switch element in the form of a normally open contact is preferably connected in parallel with the relevant electric motor, the switch element short-circuiting the connection terminals of the electric motor in the event of excessive temperatures. As a result, the internal resistance of the electric motor is considerably reduced such that a current rise resulting therefrom exceeds a permissible, predeterminable limit value. Furthermore, such a parallel circuit of the switch element with the electric motor makes it possible to detect the critical temperatures directly at the element bringing about the temperature increase.

In one preferred embodiment, each electric motor has an associated switch element, it being possible for the switch elements to be tripped independently of one another. If in this case in the event of a fault only one of the electric motors is automatically disconnected by means of the associated switch element, the other can continue to operate according to its specifications, preferably at increased speed in order to increase the cooling power and thus the airflow power.

In order to be able to reliably detect a temperature-related fault, the switch element is expediently in the form of a thermal circuit breaker, in particular in the form of a bimetallic strip. Such a thermal release, in particular the bimetallic strip, bends on heating and is tripped in the event of an excess current.

For particularly reliable and simple detection of excessive temperatures at the electric motor, the switch element is integrated in the electric motor. In one preferred embodiment, in this case the switch element is arranged on the mounting side of a brush plate of the electric motor connected in parallel with the electric motor. This results in sufficiently good heat transfer for the purpose of identifying the excessive temperatures and thus the overload on the respective electric motor. Furthermore, such an arrangement of the switch element on the mounting side of the brush plate requires little physical space and can thus easily be introduced particularly simply in free spaces provided on the mounting side and can thus easily be retrofitted. Furthermore, a switch element arranged in this manner does not require any additional wiring complexity. In addition, in this case a low contact resistance is provided in the event of a short circuit of the switch element.

The switch element is preferably designed such that it is tripped above a specified motor operating temperature. In other words: For a simple design of the switch element it is sufficient for its tolerance ranges for tripping to be above a predeterminable, critical temperature range for the respective electric motor.

In addition, a fuse element, for example a fusible link or another electronic fuse component, is expediently provided for disconnecting a circuit supplying the electric motor when a predeterminable, critical limit value is exceeded. In other words: In addition to the temperature-dependent tripping of the switch element and thus to a first stage of fault correction by short-circuiting the faulty electric motor, a fuse element for current-dependent tripping may be provided in a second stage. By this means, the circuit, i.e. the power supply to the electric motor, is interrupted when a predeterminable, critical current value is exceeded. In order to avoid electromagnetic interference, caused by the motor system, an interference suppression capacitor or another interference suppression component is expediently connected in parallel with the switch element. A conventional capacitor is used as the interference suppression capacitor.

The object set as regards the method for protecting against overload of the electric motor, in particular of the electrically driven fan blower, is achieved according to the invention by two series-connected electric motors being controlled, in a speed-dependent manner, by means of at least one changeover element, in which the electric motor is short-circuited in the event of excessive temperatures by means of a switch element in the form of a normally open contact which is connected in parallel with the respective electric motor. The internal resistance of the electric motor is preferably reduced in this case such that a current increase resulting therefrom exceeds the predetermined limit value for the fuse element. This ensures that a fuse arranged in the circuit is reliably tripped. Depending on the type and design of the circuit and thus on the size of the fuse protecting the circuit, another limit value and thus another design for the thermal switch element is possible.

The advantages achieved with the invention consist in particular in the fact that a short circuit of an electric motor brought about in the event of excessive temperatures by means of a parallel circuit of a switch element in the form of a normally open contact with the electric motor makes possible a particularly reliable and simple fire-protection arrangement even for two series-connected electric motors (also known as twin fans). Integrating the thermal switch element in the electric motor itself makes it possible to detect and monitor the critical temperatures directly at the source of heat. A switch element which is associated with the respective motor or fan ensures separate monitoring and thus also separate safety disconnection of the respective faulty motor. Once the fault has been eliminated, the normal operation of the relevant electric motor can be activated again by replacing the tripped fuse.

Figure 3B:
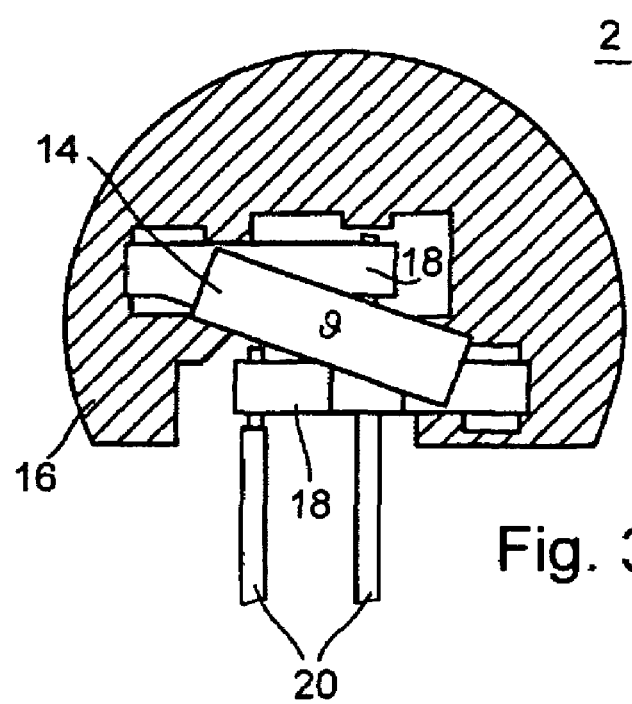
Figure 4A:
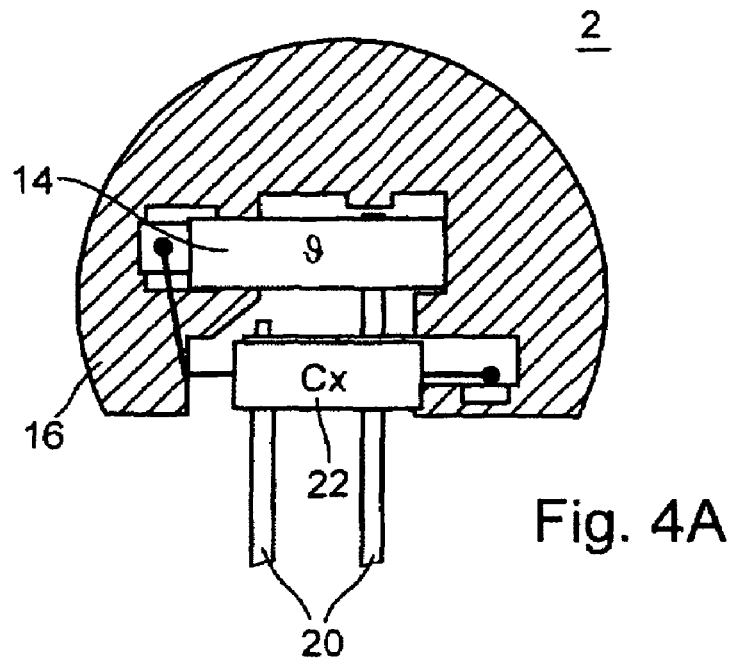
Figure 4B:
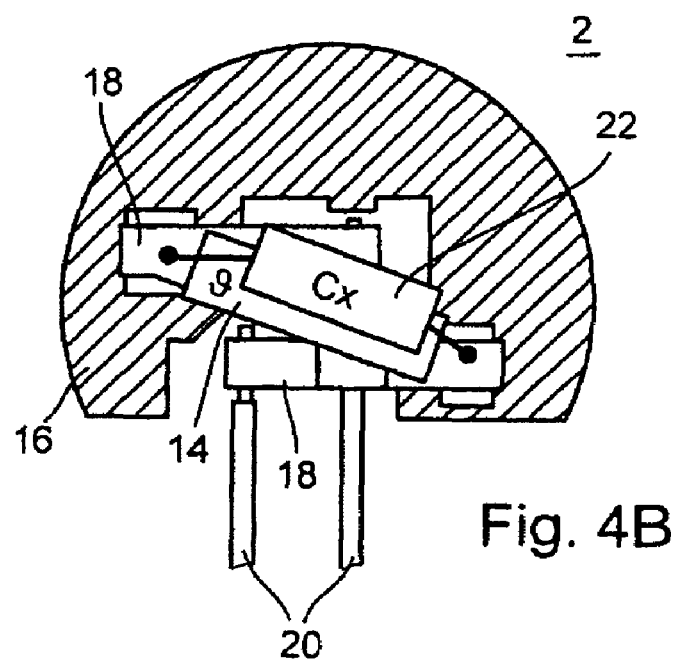

Exemplary embodiments of the invention are explained in more detail with reference to a drawing, in which:

FIGS. 1A, 1B show a circuit diagram of an arrangement for protecting against overload of two series-connected electric motors each having an associated switch element in the normal state, FIGS. 2A, 2B show a circuit diagram of the arrangement shown in FIG. 1 in the tripped state, FIGS. 3A, 3B show a schematic illustration of the arrangement shown in FIG. 1 for an individual electric motor in the installed state, and FIGS. 4A, 4B show a schematic illustration of the arrangement shown in FIGS. 3A, 3B having an interference suppression capacitor connected in parallel with the switch element.

Mutually corresponding parts are provided with the same reference numerals in all of the figures.

FIG. 1A shows a circuit for an arrangement 1 for protecting (referred to below as protective arrangement 1 for short) against overload of an electric motor 2. The exemplary embodiment shows, for the purpose of ventilating an internal combustion engine (not shown in any more detail) of a vehicle, two electric motors 2, which are connected in series in a circuit 4. The series-connected electric motors 2 are used for driving in each case an associated fan blower (not shown in any more detail) for cooling the internal combustion engine.

For operating such a two-stage fan system for the internal combustion engine at different speed levels n, the two electric motors 2 are on the one hand connected in series for a minimum speed and on the other hand connected in parallel for a maximum speed by means of a changeover element 6. In order to protect the circuit 4, a fuse element 8 is also connected in series with the electric motors 2. The electric motors 2 are connected to a power supply (not shown in any more detail), for example a battery, via an output terminal In order to protect the respective fan and its electric motor 2 against an overload, such as may occur, for example, in the event of the blower or the fan being blocked, the protective arrangement 1 comprises a switch element 14 in the form of a normally open contact 12, which is connected in parallel with the electric motor 2. Depending on the type and design of the protective arrangement 1, each electric motor 2 may be provided with an associated switch element 14. The switch element 14 is preferably in the form of a thermal circuit breaker, for example a bimetallic strip.

During normal operation of the circuit 4, i.e. during normal operation of the fan system formed from two series-connected electric motors 2, the normally open contacts 12 are open. The normal state of the normally open contact 12 is illustrated in FIGS. 1A and 1B (=equivalent circuit diagram).

If excessive temperatures now occur, for example owing to one of the fans becoming blocked, i.e. a critical temperature is exceeded and, as a result, the internal resistance Ri of the respective electric motor 2 is increased such that a tripping current required for tripping the fuse element 8, in particular the predetermined limit value, is still not reached, this in turn would result in a considerable thermal load.

In order to avoid such thermal loads, the switch element 14 is designed such that the normally open contact 12 is tripped when there is a temperature θ above the specified operating temperature. That is to say the normally open contact 12 is closed, as is illustrated in FIGS. 2A and 2B. This results in the relevant electric motor 2 being short-circuited, with the result that the internal resistance Ri is reduced. The reduction in the internal resistance Ri leads to a current increase, the fuse element 8 being tripped and the circuit 4 interrupted when a critical value, for example the specified limit value, is exceeded. Two protection criteria are thus used for tripping two separate protective elements—firstly a critical temperature θ is used to reduce the internal resistance Ri in the electric motor 2 by a short circuit by means of the switch element 14 and secondly a critical current value is used for disconnecting, for safety reasons, the circuit 4 of the relevant electric motor 2 by means of the fuse element 8.

Depending on the type and design of the protective arrangement 1, in the event of a fault only one of the electric motors 2 can be short-circuited by means of the switch element 14; the other electric motor 2 continues to operate at a higher speed n. In this case, the fuse element 8 is not tripped.

As an alternative to or in addition to the protection of the respective electric motor 2 by means of the switch element 14, the electric motors 2 may be connected in parallel by means of the changeover element 6. This then results in a reliable response of the fuse element 8 in the event of a fault.

FIGS. 3A and 3B show different embodiments for installing the switch element 14 on the respective electric motor 2. For particularly reliable identification of the thermal load and thus timely tripping of the protective arrangement 1 in the event of an overload, in particular in the event of excessive temperatures, the switch element 14 is connected in parallel with the respective electric motor 2, in particular directly in the vicinity of the location at which the heat is produced in the event of a fault. For this purpose, the switch element 14 is preferably integrated in the respective electric motor 2.

In one preferred embodiment, the switch element 14 is arranged on the mounting side of a brush plate 16 of the electric motor 2. For the purpose of supplying power to the electric motor 2, two busbars 18 of the brush plate 16 in the form of a mounting plate are connected to power supply lines 20. For particularly effective contact resistance, the switch element 14 is connected between the two busbars 18, as is illustrated by way of example in FIGS. 3A and 3B. In this case, the switch element 14 is sufficiently well electrically insulated from the busbars 18 or the brush plate 16.

In order to avoid electromagnetic interference when tripping the switch element 14 in the form of a normally open contact 12, an interference suppression capacitor 22 can be connected in parallel with said switch element 14. This is illustrated by way of example in FIGS. 4A and 4B, respectively, for the various arrangements of the switch element 14 between the two busbars 18.

LIST OF REFERENCE NUMERALS

1 Arrangement for protecting against overload of an electric motor
2 Electric motor
4 Circuit
6 Changeover element
8 Fuse element
10 Output terminal
12 Normally open contact
14 Switch element
16 Brush plate
18 Busbars
20 Power supply lines
22 Interference suppression capacitor

The invention claimed is:

1. An arrangement for protecting against overload of an electric motor of an electrically driven fan blower for a vehicle, comprising at least one changeover element for controlling, in a speed-dependent manner, two series-connected electric motors, in which a switch element in the form of a normally open contact is connected in parallel with the electric motor and, in the event of excessive temperatures, causes the relevant electric motor to be short-circuited.

2. The arrangement as claimed in claim 1, in which each electric motor has an associated switch element, which are tripped independently of one another.

3. The arrangement as claimed in claim 1, in which the switch element is in the form of a thermal circuit breaker, in particular in the form of a bimetallic strip.

4. The arrangement as claimed in claim 1, in which the switch element is integrated in the electric motor.

5. The arrangement as claimed in claim 1, in which the switch element is arranged on the mounting side of a brush plate of the electric motor connected in parallel with the electric motor.

6. The arrangement as claimed in claim 1, in which the switch element is designed such that it is tripped at a temperature ($\theta$) above a specified motor operating temperature.

7. The arrangement as claimed in claim 1, in which a fuse element is provided for disconnecting a circuit supplying the electric motor when a predeterminable, critical limit value is exceeded.

8. The arrangement as claimed in claim 1, in which an interference suppression capacitor is connected in parallel with the switch element.

9. A method for protecting against overload of an electric motor of an electrically driven fan blower for a vehicle, comprising controlling two series-connected electric motors, in a speed-dependent manner, by means of at least one changeover element, in which the electric motor is short-circuited by means of a switch element in the form of a normally open contact which is connected in parallel with the electric motor.

10. The method as claimed in claim 9, in which the internal resistance ($R_i$) of the electric motor is reduced such that a current increase resulting therefrom exceeds a predeterminable limit value.

* * * * *